US010555328B2

(12) United States Patent
Choudhary et al.

(10) Patent No.: US 10,555,328 B2
(45) Date of Patent: Feb. 4, 2020

(54) SCALABLE COEXISTENCE SCHEME FOR WLAN OPERATION WITH MULTIPLE PERIODIC BT CONNECTIONS

(71) Applicant: Avago Technologies International Sales Pte. Limited, Singapore (SG)

(72) Inventors: Amit Choudhary, Bangalore (IN); Abishek Ambrose, Bangalore (IN); Pradhap Asokan, Salem (IN); Bobby Joseph, Bangalore (IN); Tarun Temker, Bangalore (IN); Joby Paily Aliyath, Bangalore (IN); Amrit Swarup Devulapalli, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/436,497

(22) Filed: Feb. 17, 2017

(65) Prior Publication Data
US 2018/0242339 A1    Aug. 23, 2018

(51) Int. Cl.
*H04W 72/12* (2009.01)
*H04W 4/80* (2018.01)
*H04W 84/12* (2009.01)

(52) U.S. Cl.
CPC ......... *H04W 72/1215* (2013.01); *H04W 4/80* (2018.02); *H04W 84/12* (2013.01)

(58) Field of Classification Search
CPC ... H04W 72/1215; H04W 4/80; H04W 4/008; H04W 84/12
See application file for complete search history.

(56) References Cited

U.S. PATENT DOCUMENTS

| 8,249,031 B1* | 8/2012 | Hirsch | H04W 72/1215 370/336 |
|---|---|---|---|
| 8,335,206 B1* | 12/2012 | Hirsch | H04W 72/1215 370/349 |
| 2006/0194538 A1* | 8/2006 | Palin | H04L 1/1887 455/41.2 |
| 2006/0194600 A1* | 8/2006 | Palin | H04W 16/14 455/512 |
| 2006/0205401 A1* | 9/2006 | Palin | H04M 1/2535 455/425 |
| 2006/0292986 A1* | 12/2006 | Bitran | H04W 16/14 455/41.2 |

(Continued)

OTHER PUBLICATIONS

Argenox Technologies, A BLE Advertising Primer, printed from internet website http://www.argenox.com/a-ble-advertsing-primer on Feb. 15, 2017, 16 pages.

*Primary Examiner* — Peter P Chau
(74) *Attorney, Agent, or Firm* — Foley & Lardner (57) ABSTRACT

Wireless communication devices capable of both wireless local area network (WLAN) and Bluetooth (BT) network communication, and related methods, are provided. In some implementations, the BT network includes a plurality of BT connections. One wireless communication device is configured to determine an aggregated time schedule for the plurality of BT connections and determine a WLAN schedule based on the aggregated time schedule. The device is configured to remap a BT scan schedule based on a WLAN traffic type, a selected duty cycle of the BT connection, and a remapping window.

15 Claims, 8 Drawing Sheets

(56) References Cited

U.S. PATENT DOCUMENTS

| | | | | |
|---|---|---|---|---|
| 2007/0021066 | A1* | 1/2007 | Dravida | H04W 16/14 455/41.2 |
| 2007/0223430 | A1* | 9/2007 | Desai | H04L 1/1854 370/338 |
| 2008/0279138 | A1* | 11/2008 | Gonikberg | H04W 8/005 370/328 |
| 2009/0197639 | A1* | 8/2009 | Khairmode | H04W 88/06 455/553.1 |
| 2011/0002291 | A1* | 1/2011 | Gonikberg | H04W 8/005 370/329 |
| 2012/0106419 | A1* | 5/2012 | Gonikberg | H04W 8/005 370/311 |
| 2013/0155931 | A1* | 6/2013 | Prajapati | H04W 72/044 370/311 |
| 2013/0258931 | A1* | 10/2013 | Gonikberg | H04W 8/005 370/311 |
| 2013/0260686 | A1* | 10/2013 | Mukherjee | G06F 9/5027 455/41.2 |
| 2014/0269309 | A1* | 9/2014 | Lee | H04W 52/0235 370/235 |

\* cited by examiner

SCALABLE COEXISTENCE SCHEME FOR WLAN OPERATION WITH MULTIPLE PERIODIC BT CONNECTIONS

FIELD

This disclosure generally relates to wireless communication.

BACKGROUND

Smart devices (e.g., smart phones, tablets, TVs, etc.) are becoming more commonly used for wireless communications. Wireless connectivity (e.g., Bluetooth (BT), wireless local area networks (WLAN), etc.) is a common feature of smart devices. The demand for wireless connectivity using different wireless technologies by smart devices is growing rapidly. The most widely used wireless networking technologies are wireless local area network (WLAN) and Bluetooth (BT). For example, a smart phone may be connected to an access point (AP) via a WLAN connection, simultaneously connected to a BT speaker via a first BT connection, and simultaneously connected to a BT keyboard via a second BT connection.

A smart device may utilize a hardware interface to support coexistence of WLAN and BT. WLAN and BT may share one or more 2.4 GHz antennas for the coexistent connections. As WLAN and BT both operate in the 2.4 GHz Industrial, Scientific, and Medical ("ISM") band, interference between data streams using both WLAN and BT can occur. The interference can result in lost data and/or increased latency in either or both of the WLAN and BT communications.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

An electronic device (e.g., smart device) that includes both WLAN and BT can be involved in a WLAN connection and multiple BT connections. It is desirable to support multiple wireless connections without significant loss in data traffic. However, with currently available solutions, interference between the WLAN and the multiple BT connections may occur. The interference may result in various problems, such as low/inconsistent WLAN throughput, WLAN disconnection, BT connection choppiness, breaks in the BT device inputs, BT disconnections, etc. Described herein are systems and methods for providing improved connectivity for devices with multiple WLAN and/or BT connections. While the present disclosure specifically addresses WLAN and BT connections, it should be understood that, in various embodiments, the concepts discussed herein can be applied to other types of wireless protocols without departing from the scope of the present disclosure.

As most of the BT connections are periodic and predictable in nature, some embodiments of the present disclosure take advantage of the periodicity and predictability of BT activities over the BT connections to improve the coexistence between WLAN and BT by sharing a real time data about the BT tasks to WLAN, which can be used to better predict the subsequent usage of the shared antenna by WLAN and BT communications.

In some embodiments, the solution includes two steps: aggregation and prediction. In the aggregation step, a bundling mechanism is used to allow BT to bundle adjacent periodic tasks of the multiple BT connections. In the prediction step, a prediction algorithm is used to calculate a next BT duration and a duration to the next BT grant. The calculated BT duration and duration to next BT grant is shared to the WLAN, so that the WLAN can better schedule WLAN activity and avoid loss of WLAN reception frames.

The electronic device can use a scanning mechanism to communicate with a peripheral BT device according to an exemplary implementation. The peripheral BT device broadcasts packets to devices around it. The scanning mechanism allows the electronic device to periodically scan for the broadcast packets from the peripheral device and act on the received information or connect to receive more information. In some implementations, the scan interval of the scanning mechanism can be 100% duty cycle (for example, maximum scan interval/window of 10.24 sec), and the electronic device might not have restriction on the BT scanning mechanism. It can be desirable to ensure a fair medium sharing between BT scanning and WLAN in the 2.4 GHz band, otherwise one of the WLAN and the BT will get starved and lead to poor wireless connections. For example, consider an electronic device used for video streaming over a WLAN connection and configured with a 100% BT scan duty cycle. Because the WLAN allows the BT scan without restriction, the video streaming over the WLAN connection can get stalled and the WLAN connection can get disconnected. Thus, it would be advantageous to provide a dynamic scaling medium sharing between WLAN and BT scan.

An implementation of the present disclosure relates to a wireless communication device that is capable of communicating with other devices via both WLAN and BT. The BT network includes a plurality of BT connections. The wireless communication device includes circuitry configured to: determine a time schedule associated with BT activities for each BT connection of the BT network; determine, for at least one time schedule, one or more adjacent time schedules associated with different BT connections; aggregate the at least one time schedule with the one or more adjacent time schedule; determine an aggregated time schedule for the plurality of BT connections using the aggregation; and determine a WLAN schedule based at least in part on the aggregated time schedule for the plurality of BT connections.

Another implementation of the present disclosure relates to a method for providing wireless communications in a coexisted WLAN and BT network. The method includes: determining a time schedule associated with BT activities for each of a plurality of BT connections of the BT network; determining, for at least one time schedule, one or more adjacent time schedules associated with different BT connections; aggregating the at least one time schedule with the one or more adjacent time schedules; determining an aggregated time schedule for the plurality of BT connections using the aggregation; and determining a WLAN schedule based at least in part on the aggregated time schedule for the plurality of BT connections.

Another implementation of the present disclosure relates to a method for providing wireless communications in a wireless system including both a wireless local area network (WLAN) and a Bluetooth low energy (BLE) network. The method includes: detecting a WLAN connection within the WLAN and one or more Bluetooth connections within the BLE network, the BT connection associated with a first scan interval; determining a traffic type associated with the WLAN connection; determining a BT scan remapping window and a duty cycle of the one or more BT connections; and modifying the first scan interval to a different second scan interval using the traffic type, the remapping window and the duty cycle.

Figure 1:
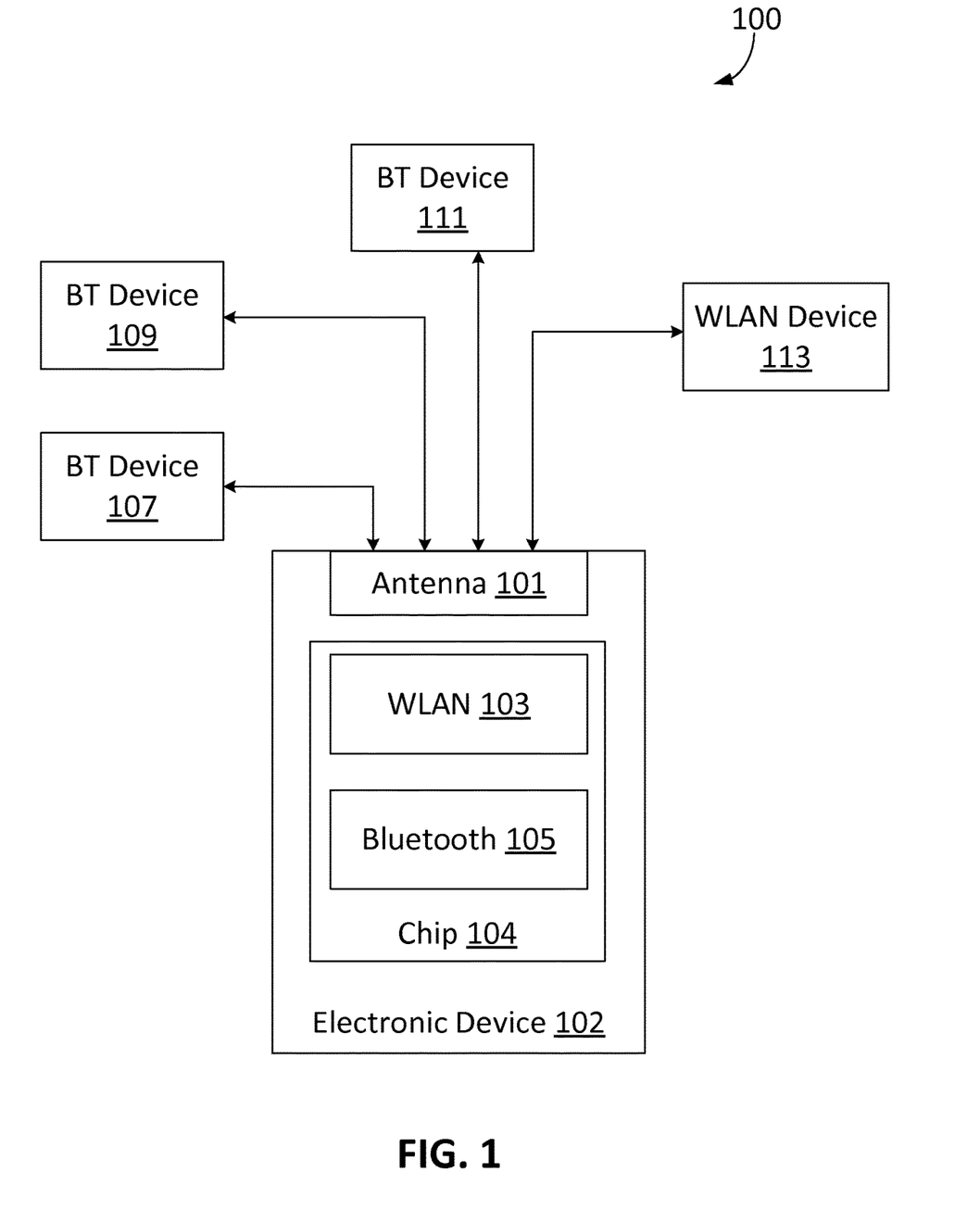
FIG. 1 is a block diagram of a system architecture for coexistence of BT and WLAN in an electronic device according to an illustrative implementation.

Referring now to FIG. 1, a block diagram of a system architecture for coexistence of BT and WLAN in an electronic device is shown according to an illustrative implementation. The system 100 includes an electronic device 102, BT devices 107, 109, and 111, and WLAN device 113. The electronic device 102 can be any device operative to utilize both BT and WLAN communications. The electronic device 102 includes an antenna 101 and a combo chip 104 according to some implementations. The electronic device 102 can utilize the shared antenna 101 to maintain multiple BT links (e.g., links between BT devices 107, 109, 111 and the electronic device 102) and a WLAN link (e.g., link between the WLAN device 113 and the electronic device 102). In some implementations, more than one antenna is used to provide the functionality of the antenna 101.

In some implementations, the combo chip 104 is an integrated circuit that enables the support of multiple wireless technologies simultaneously by means of coexistence arbitrations over the proprietary hardware interface. The combo chip 104 can be suitable hardware, logic, and/or circuitry adapted to provide integrated BT baseband/RF and WLAN for the electronic device 102. In some implementations, the combo chip 104 acts as a transceiver for both WLAN and BT. The combo chip 104 includes a WLAN circuit 103 and a Bluetooth circuit 105.

In some implementations, the WLAN circuit 103 can include suitable logic, circuitry, and/or code adapted to schedule and control WLAN protocol signals for communications, which includes transmissions and receptions of WLAN signals via the antenna 101. The BT circuit 105 includes suitable logic, circuitry, and/or code adapted to control and monitor BT communications, which includes transmissions and receptions of BT signals via the shared antenna 101.

According to some implementations, the electronic device 102 utilizes the combo chip 104 to enable multiple BT connections, such as BT connections between the electronic device 102 and BT devices 107, 109, and 111. According to some embodiments, the BT devices 107, 109, and 111 are any electronic device operative to utilize BT communication. The electronic device 102 can utilize the combo chip 104 to connect to a WLAN device 113 via a WLAN connection. The WLAN device 113 can be any device operative to utilize WLAN communication.

According to some implementations, the BT circuit 105 enables BT communications via BT connections between the electronic device 102 and multiple BT devices 107, 109, and 111. Each periodic BT connection enables transmissions of BT events or tasks at a BT schedule. The BT schedule is a time schedule for transmissions of the BT events or tasks. Each BT schedule includes anchor points and time intervals between the anchor points. The anchor point represents a start time point for a BT event or task transmission. The time intervals can be used for calculating a next anchor point. The BT circuit 105 can monitor all the BT connections and BT communications via the BT connections. The BT circuit 105 can also determine time offset between two different periodic connections.

In some implementations, the BT circuit 105 utilizes a bundling mechanism to allow BT to bundle adjacent periodic tasks or events by aggregating adjacent anchor points using the BT schedules and the offsets data. For one or more (e.g., every) anchor points of a BT connection, the BT circuit 105 can determine if there exists another anchor point of a different periodic connection in the vicinity. For example, in some embodiments, the BT circuit 105 calculates time difference between an anchor point and its adjacent anchor point of a different connection using the time schedule data and the offsets data. The BT circuit 105 compares the time difference with a threshold value. If the time difference is less than the threshold value, the anchor point and the adjacent anchor point are aggregated into an aggregated time slot. In some implementations, the threshold value is predetermined. In some implementations, the threshold value is determined based on the applications associated with the BT connections. For example, in some embodiments, the threshold value is a first value for a first type of application and a second value for a second type of application. In some such embodiments, the first type of application is an application for which reduced latency is desired as compared to the second type of application. In some implementations, the threshold value is configurable for scalability.

The BT circuit 105 can determine an aggregated schedule including one or more aggregated time slots and aggregated time intervals between the time slots. Each aggregated time slot includes one or more bundled anchor points. As a BT event or task occurred at each anchor point, each aggregated time slot is associated with an aggregation of BT events or tasks. A time duration for each aggregated time slot can be calculated as sum of total duration of the BT task associated with each anchor point of the aggregated time slot.

In some implementations, the BT circuit 105 utilizes a prediction algorithm to determine a BT grant schedule for the multiple BT connections based upon the aggregated schedule. The BT grant schedule includes one or more BT grant time slots and one or more next BT grant intervals representing time to the next BT high priority grant request. The one or more BT grant time slots are determined as aggregated time slots at which a BT high priority grant request is received in some implementations. Upon receiving the BT high priority grant request, the combo chip 104 can prioritize the antenna to the BT connections.

In some implementations, each periodic BT connection is provided with a latency slot limit representing a maximum acceptable delay. In some implementations, the latency slot limit is a configurable value that can be changed dynamically based on the periodicity. The next BT grant interval representing time to the next BT high priority grant request can be calculated based on the latency slot limit of each BT connection. In some implementations, the next BT grant interval is a function of the time intervals of each of BT connections and their respective configured latency slot limit.

The BT circuit 105 can transmit the determined BT grant schedule to the WLAN circuit 103. The WLAN circuit 103 determines a WLAN schedule using the BT grant schedule. The WLAN schedule reduces WLAN activity over the WLAN connection at BT grant time slots and prioritizes the WLAN activity at other time slots. In some implementations, the BT circuit 105 transmits the aggregated schedule to the WLAN circuit 103.

Figure 2:
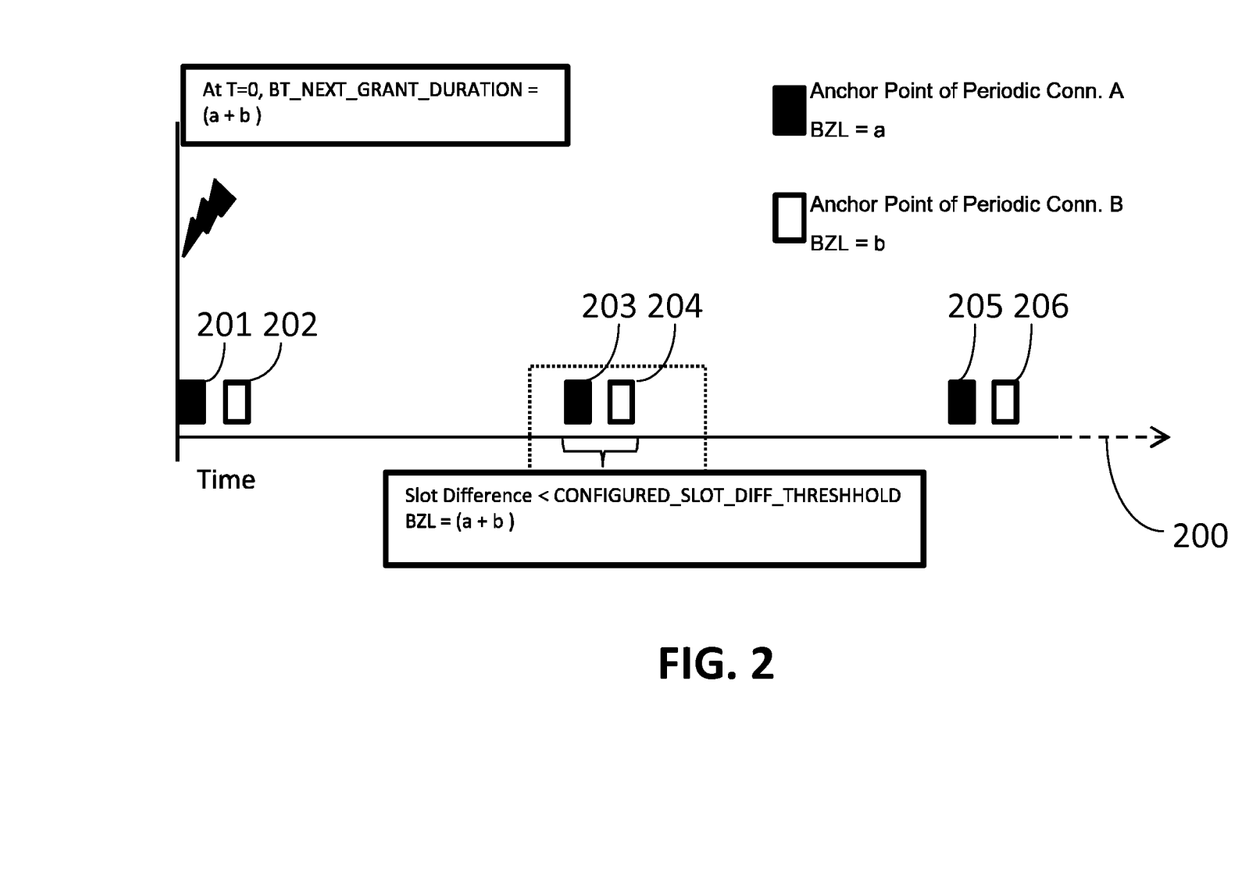
FIG. 2 is a timeline diagram of BT communications utilized an aggregation mechanism according to an illustrative implementation.

Referring now to FIG. 2, a timeline diagram of BT communications utilized an aggregation mechanism is shown according to an illustrative implementation. An electronic device has two periodic BT connections (i.e., Periodic Connection A and Periodic Conn. B). The Periodic Connection A allows BT communication according to a schedule A along the timeline 200. The schedule A includes multiple anchor points periodically arranged along the timeline with a time interval A, such as anchor points 201, 203, and 205. The schedule B also includes multiple anchor points periodically arranged along the timeline with a time interval B.

Each anchor point represents a start time point for a BT event or task transmission. Each anchor point is associated with a blackout zone length ("BZL") representing a total duration of a respective BT task. For example, the anchor points of Periodic Connection A are associated with a BZL a. The anchor points of Periodic Connection B are associated with a BZL b. The aggregation mechanism includes determining, for each anchor point of schedule A, whether there exists another anchor point of a different periodic connection in the vicinity. For example, for anchor point 203 of schedule A, an anchor point 204 of schedule B exists in the vicinity.

In response to determining one or more anchor points of different periodic connections are adjacent to the anchor point, a slot difference between the anchor point and each of its adjacent anchor points can be calculated. The aggregation mechanism includes comparing each slot difference with a threshold value. As shown in FIG. 2, when the slot difference between anchor point 203 and anchor point 204 is less than the threshold value, the anchor point 203 and anchor point 204 are bundled together as an aggregated anchor point. The aggregated anchor points (e.g., bundled points 201 and 202, bundled points 203 and 204, bundled points 205 and 206) form an aggregated schedule. A duration for each aggregated anchor point is calculated as sum of total duration of the BT task (i.e., BZL) associated with each anchor point of the aggregated time slot. For example, as shown in FIG. 2, the duration of the aggregated anchor point is a+b, which is the sum of the BZLs of anchor point 203 and anchor point 204.

Figure 3:
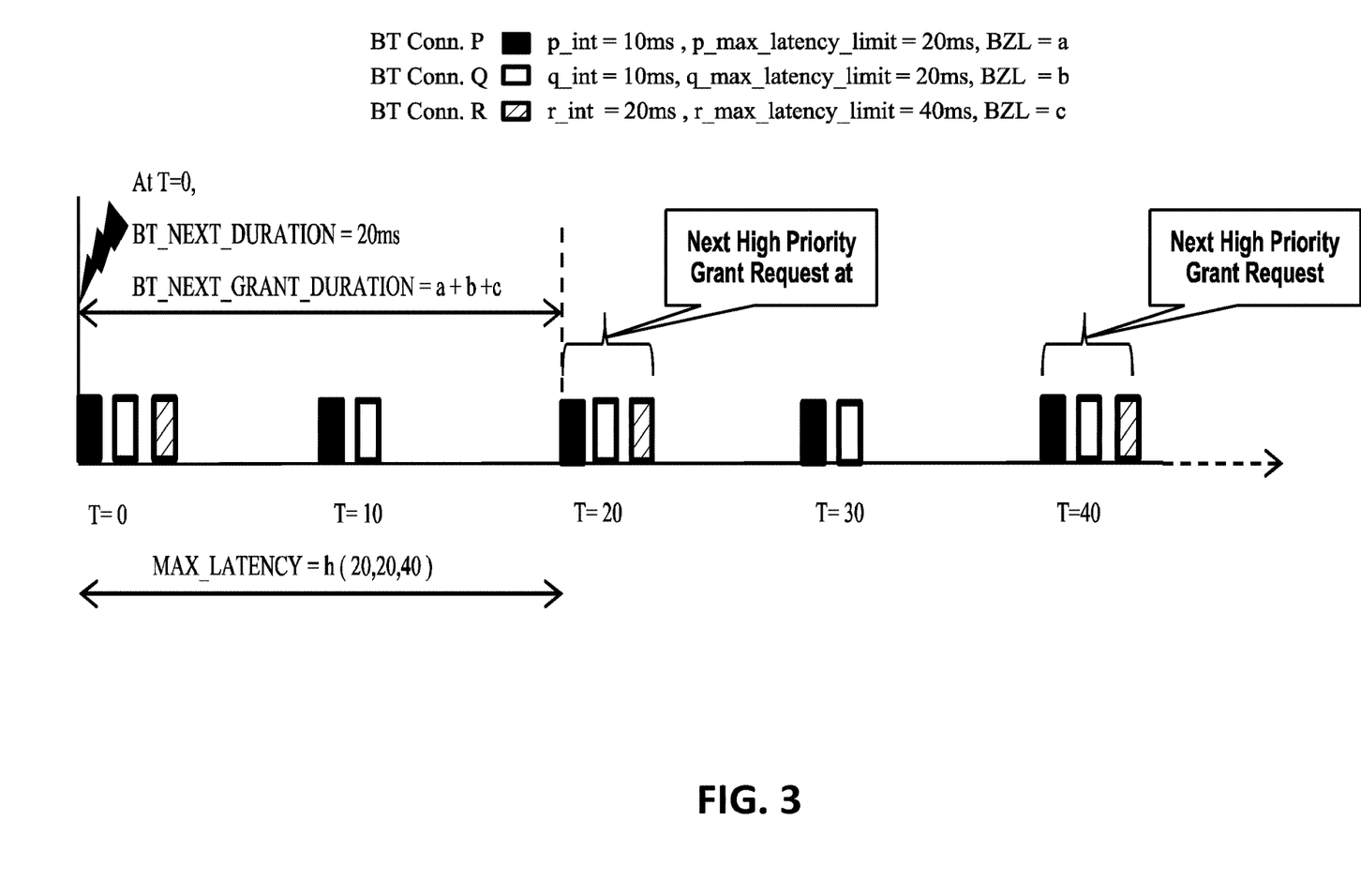
FIG. 3 is a timeline diagram of BT communications utilized a prediction algorithm according to an illustrative implementation.

Referring now to FIG. 3, a timeline diagram of BT communications utilized in a prediction algorithm is shown according to an illustrative implementation. An aggregated schedule is formed using the aggregation mechanism as discussed above. The aggregated schedule includes one or more aggregated anchor points. Each aggregated anchor point is formed by bundling two or three adjacent anchor points. For example, as shown in FIG. 3, at T=0, three anchor points of BT connections (BT Connections P, Q, R) are bundled into one aggregated anchor point. At T=10, two anchor points of BT connections (BT Connections P and Q) are bundled into one aggregated anchor point.

In order to share time and medium resources between BT and WLAN, BT can be granted upon a high priority grant request based on a BT grant schedule. In the illustrated implementation, the BT grant schedule is determined based on the aggregated schedule. The BT grant schedule includes time intervals between BT grants and duration for each grant. The prediction algorithm is used to calculate the time to the next BT grant and the duration of the grant within the aggregated schedule. As shown in FIG. 3, an electronic device has three active BT connections P, Q, R. The BT connections P, Q, and R have different configurations. For example, BT connection P has a time interval pint of 10 ms, a latency slot limit p_max_latency_limit of 20 ms, and a BZL of a. BT connection Q has a configuration of q_int=10 ms, q_max_latency_limit=20 ms, BZL=b. BT connection R has a configuration of r_int=20 ms, r_max_latency_limit=40 ms, BZL=c.

In the illustrated implementation, the time to the next BT grant is calculated as a function of intervals of all the BT connections and a large latency of each BT connection. For example, as shown in FIG. 3, the time to the next BT grant (i.e., BT_NEXT_DURATION) can be calculated using the following function:

$$BT\_NEXT\_DURATION = f[g(p\_int, q\_int, r\_int \ldots), h(p\_max\_latency\_limit, q\_max\_latency\_limit, r\_max\_latency\_limit \ldots)]$$

Note that g( ) and h( ) are functions of periodic interval s and large latency limits of the periodic connections respectively. The g and h functions are implementation specific.

In the illustrated implementation, the duration of the grant is calculated as a sum of the BZLs of the BT connections. For example, as shown in FIG. 3, the duration of the grant BT_NEXT_GRANT_DURATION=a+b+c. A BT grant schedule is determined using the calculated duration of the grant, the time to the next BT grant, and the aggregated schedule.

Figure 4:
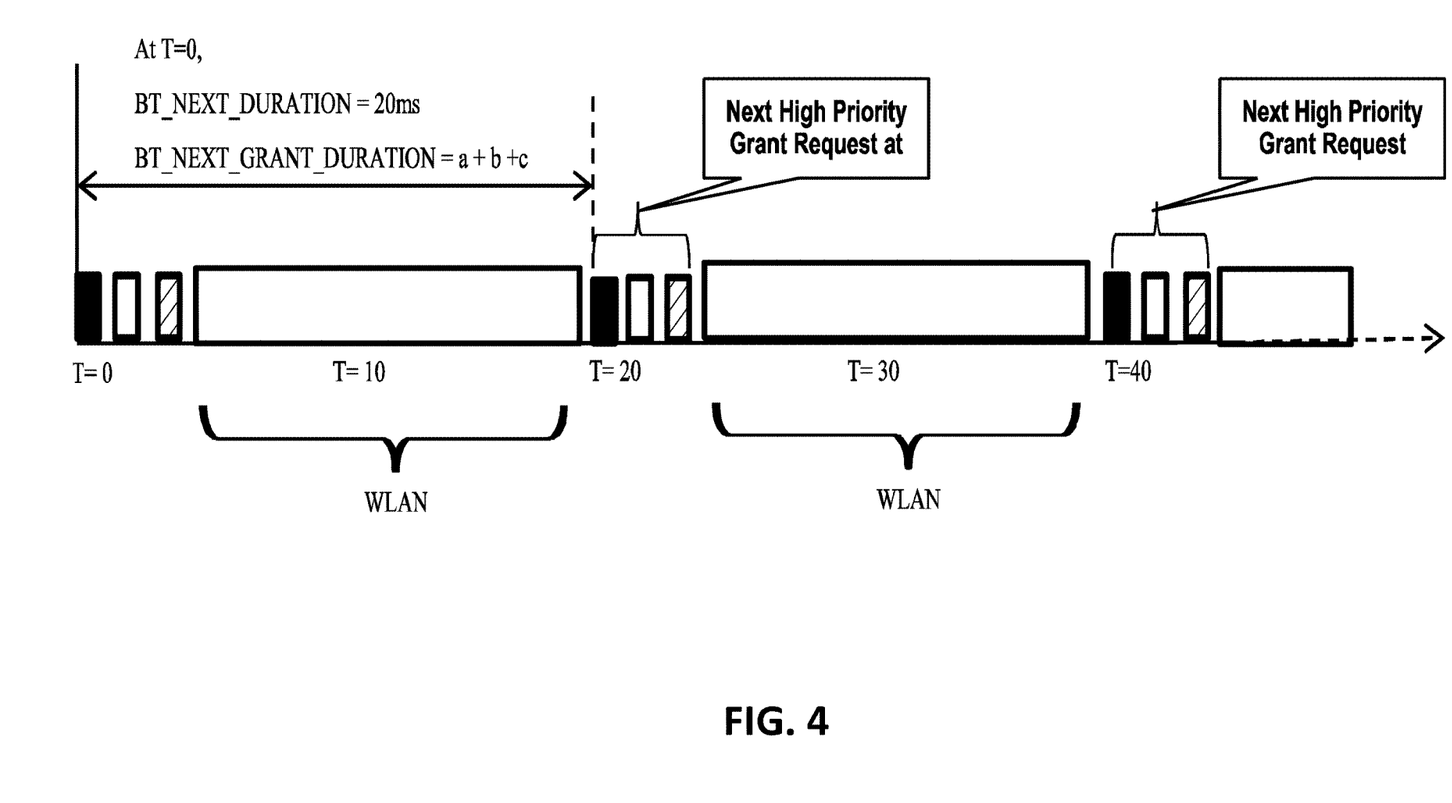
FIG. 4 is a diagram of communication schedule for coexistence of WLAN and BT communications according to an illustrative implementation.

Referring now to FIG. 4, a diagram of communication schedule for coexistence of WLAN and BT communications is shown according to an illustrative implementation. In the coexistence of WLAN and BT network, BT and WLAN are scheduled based on time division multiplexing (TDM), which allows for sharing of time, and hence, of the wireless medium, between the BT and the WLAN. Upon determining the BT grant schedule as discussed above with respect to FIG. 3, a BT controller can share the BT grant schedule with a WLAN controller. The WLAN controller determines a WLAN schedule based on the BT grant schedule, such that the time and medium resources within coexistence of WLAN and BT network are more efficiently distributed among the WLAN and BT connections.

As shown in FIG. 4, the BT grant schedule indicates multiple aggregated anchor points at which a BT high priority grant request is received. The BT grant interval between the aggregated anchor points are determined as discussed above is 20 ms. BT transmissions can start at each aggregated anchor points and last for the duration of the BT grant a+b+c. Upon completing the BT transmission at an aggregated anchor point, WLAN can start or be prioritized to communicate. The WLAN controller can schedule the WLAN activities between the BT grant aggregated anchor points, at which no BT transmissions are granted. The determined WLAN schedule helps to avoid loss of WLAN receive (RX) frames by protecting the grant to BT.

Figure 5:
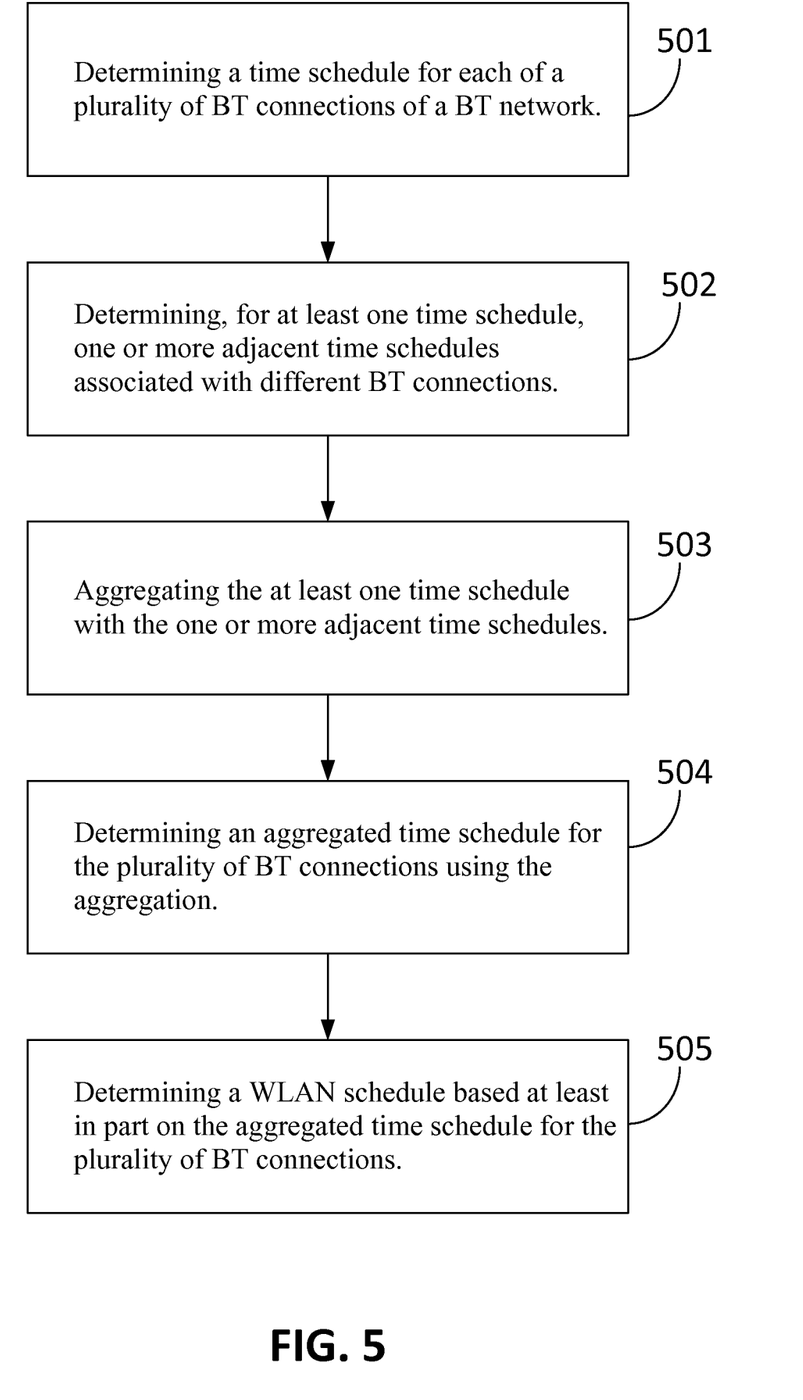
FIG. 5 is a flow chart of processes for providing wireless communications in a coexisted WLAN and BT network according to an illustrative implementation.

FIG. 5 shows a flow chart of a process for providing wireless communications in a coexisted WLAN and BT network according to an illustrative implementation. When a coexisted WLAN and BT network includes multiple BT connections, it is desirable to schedule the WLAN and BT activities to reduce the interference between WLAN and BT. At operation 501, the electronic device determines a time schedule associated with BT activities for each BT connection of the BT network. In some implementations, each time schedule is periodic in nature, such that the timing of the BT activities is predictable. Each time schedule can include multiple anchor points at which BT transmits and receives data. The time schedule can also include time intervals between the anchor points.

At operation 502, for one or more (e.g., each) time schedule of a BT connection, the electronic device determines one or more adjacent time schedules of different BT connections. The determination includes determining, for each anchor point of a time schedule, whether there is any anchor point of a different connection in the vicinity of the anchor point in question (e.g., within a threshold time of the anchor point in question). Upon determining there are one or more anchor points of different BT connections in the vicinity, the time schedules associated with the one or more anchor points can be determined as adjacent time schedules.

At operation 503, in response to determining one or more adjacent time schedules, the electronic device aggregates the time schedule with the one or more adjacent time schedules. The aggregation can include aggregating an anchor point with an adjacent anchor point of a different BT connection, if the distance from the anchor point to the adjacent anchor point is within a threshold value.

At operation 504, the electronic device determines an aggregated time schedule for two or more (e.g., all) of the BT connections using the aggregation. The aggregated time schedule includes multiple aggregated anchor points and time intervals between the aggregated anchor points. The determination can include determining an aggregated time duration for each aggregated anchor point. At each aggregated anchor point, a BT high priority grant requests is received and one or more BT events or tasks are conducted. The time duration for conducting the one or more BT tasks at the aggregated anchor point is calculated as a sum of time duration at each anchor point of the aggregated anchor point. The aggregated time interval is calculated using a function of time intervals of each BT connection and a large latency slot limit of the BT connections, in some implementations.

At operation 505, the electronic device determines a WLAN schedule using the aggregated time schedule. The WLAN schedule does not overlap with the aggregated time schedule so that interference between the WLAN and multiple BT connections can be eliminated or reduced, in some embodiments.

Figure 6:
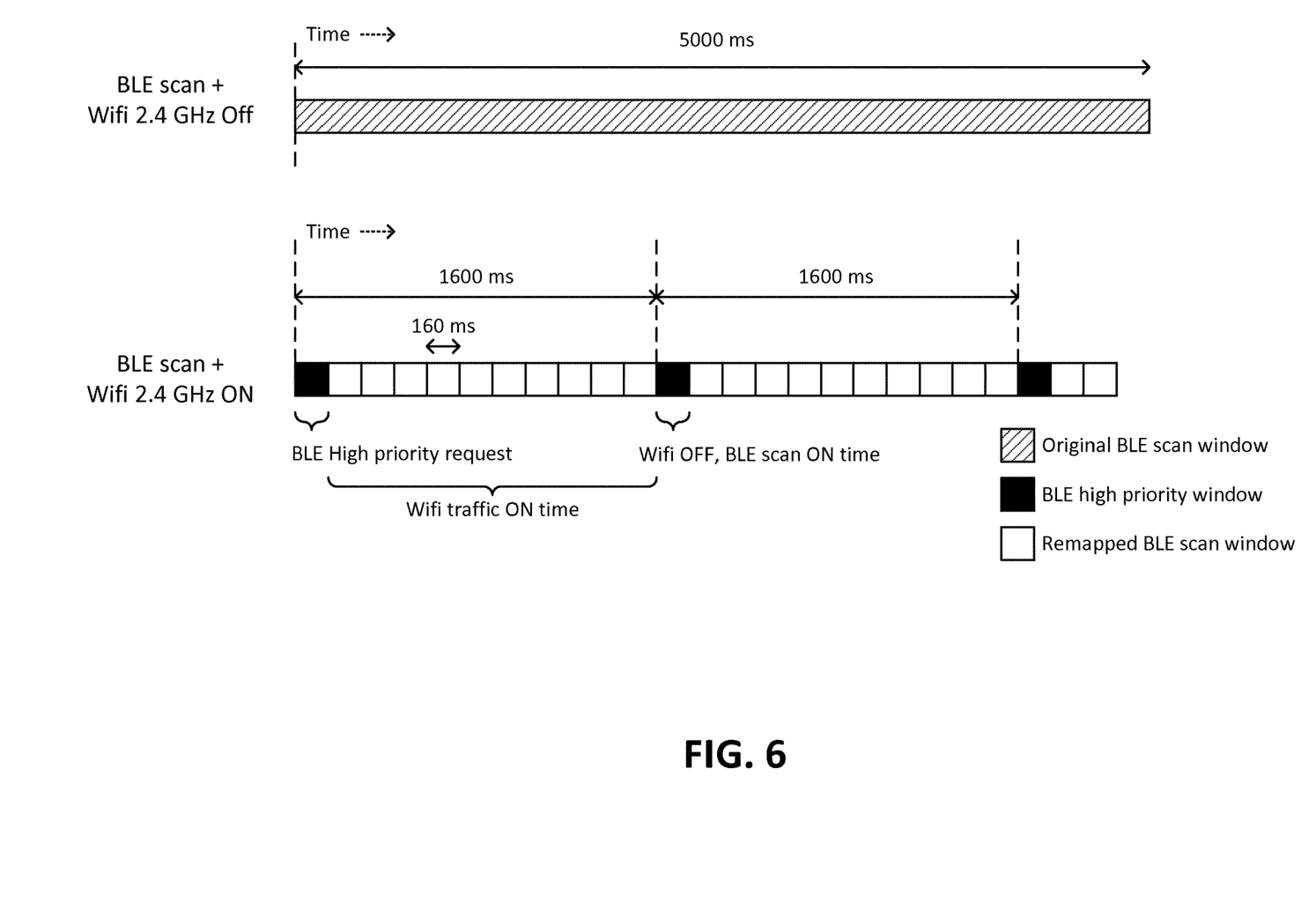
FIG. 6 is a diagram of a dynamic controlled medium sharing mechanism according to an illustrative implementation.

FIG. 6 is a diagram of a dynamic controlled medium sharing mechanism according to an illustrative implementation. In a coexisted WLAN and Bluetooth low energy (BLE) network, it is desirable to have a fair medium sharing between BLE scanning and WLAN in the 2.4 GHz band otherwise one of the technologies can get starved and lead to poor wireless communications. When WLAN is active in 2.4 GHz, the BLE interval can be remapped in such a way that the priority of the BLE scans can be handled. For example, as shown in FIG. 6, when BLE scan interval/window is 5000/5000 ms, WLAN activity might be stopped and get starved for 5000 ms, which will lead WLAN disconnection or data drops. While various implementations are described with respect to BLE, it should be understood that the features described herein can be applied to other types of BT or non-BT connections in some implementations.

The dynamic controlled medium sharing mechanism remaps the BLE scan schedule using a remapping window, such that BLE scans only at prioritized time slots, where a BLE high priority request is received, and other time slots can be used by WLAN. In some implementations, a remapping window is a configurable parameter which can also depend on the WLAN traffic type. In some implementations, if the WLAN traffic is best-effort/background traffic (e.g., reduced priority traffic), the BLE interval can be chosen as the longer interval so that BLE gets larger continuous scan time. In this way, BLE advertising reception is higher especially for the BLE devices with larger BLE advertisement interval. In some implementations, if the WLAN traffic is Video/Voice traffic or other increased-priority traffic for which lower WLAN latency is desired, the BLE remapping window can be set to a smaller size.

The BLE scan interval can be remapped based on the configuration parameters provided by the electronic device. The configuration parameters include a BLE scan remapping window and duty cycle indicating the priority, in some implementations. For example, in the implementation shown in FIG. 6, when WLAN is active, BLE performance (i.e., duty cycle) is set as 10%, which indicates every $10^{th}$ BLE interval as a priority to WLAN through a WLAN-BLE proprietary interface. At every $10^{th}$ BLE interval, BLE gets priority over WLAN, so that BLE activity is granted and WLAN activity is stopped. The time slot at every $10^{th}$ BLE interval is a BLE high priority window which prioritizes BLE to WLAN. Other time slots are remapped BLE scan window which prioritize WLAN to BLE, so that WLAN is active and BT activities is stopped.

Figure 7:
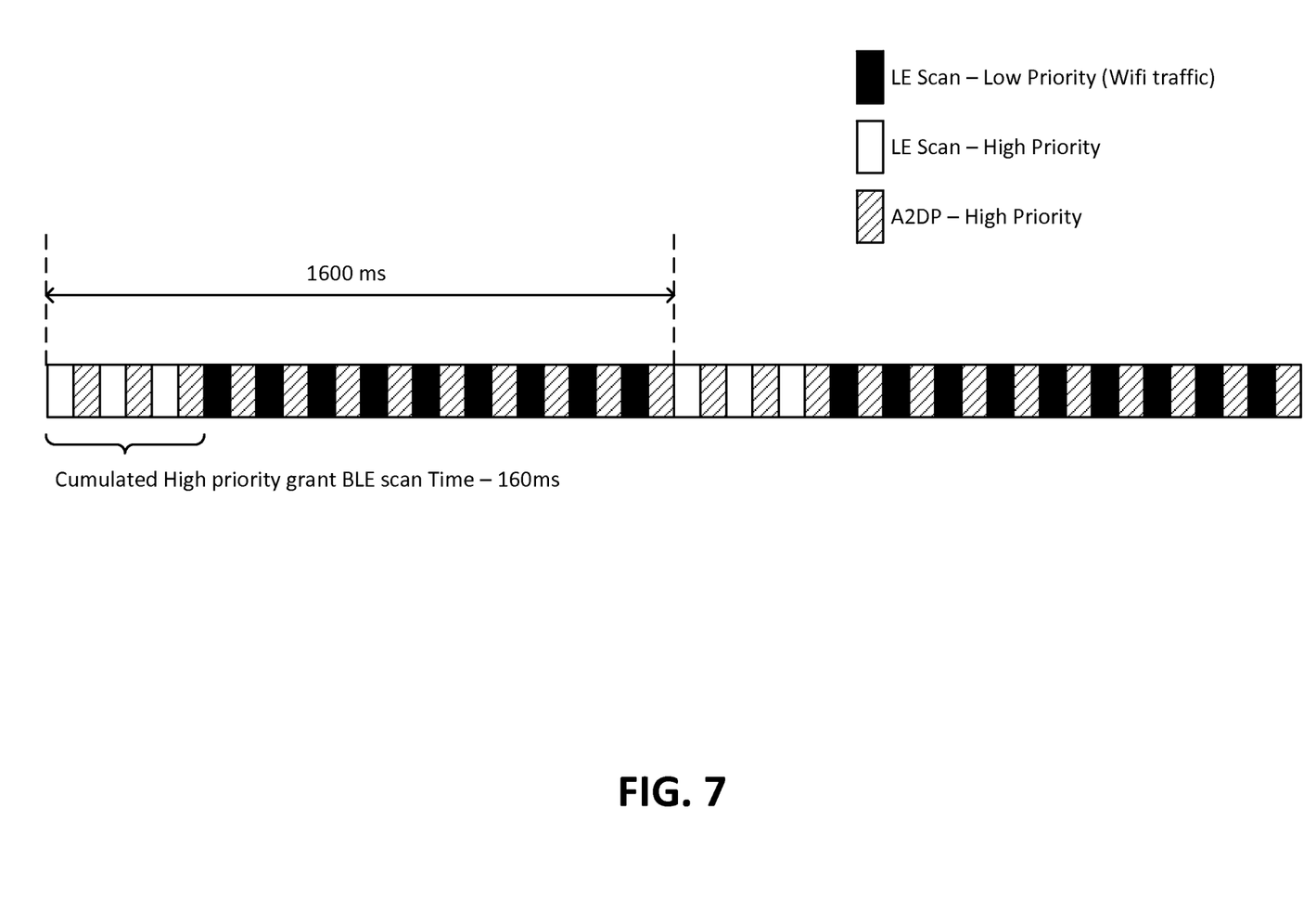
FIG. 7 is a diagram of a dynamic scaling of WLAN and BT scan solution with other priority BT activities according to an illustrative implementation.

FIG. 7 is a diagram of a dynamic scaling of WLAN and BLE scan solution with other priority BT activities according to an illustrative implementation. The dynamic scaling of the BLE scan allows the medium sharing mechanism to be effective even when BLE is running other high priority activities such as Advanced Audio Distribution Profile ("A2DP") for streaming music, voice calls along with BLE scans during ongoing WLAN traffic, etc. As shown in FIG. 7, in an example scenario, WLAN, BLE scan and A2DP are active simultaneously. Because A2DP is of higher priority and WLAN cannot deny antenna grant for A2DP, the reserved high priority BLE scan can be over shadowed by A2DP. In some such implementations, remapping of the BLE scan can be done dynamically to achieve the duty cycle requested by the application.

In some implementations, an electronic device structured to communicate using both WLAN and BLE technologies has separate antennas for WLAN and BLE. When WLAN and BLE use same channels to transmit and receive data, the BLE advertisement reception on the overlapping channel can be affected and the BLE performance can be degraded.

In some implementations, BLE scanning changes the scanning channel at every BLE window and approximately 33% of time is spent on each of the advertisement channels.

When the WLAN operating channel falls inband with BLE Advertisement channel, the BLE advertisement reception on the overlapping channel can get affected and BLE performance degradation can be around 33% compared to the BLE performance when the WLAN activity is stopped.

In some implementations, an adaptive channel selection algorithm improves the BLE advertisement reception performance with WLAN operating. The adaptive channel selection algorithm enables WLAN report the operating channels to BLE over the WLAN-BLE proprietary interface. BLE can use the received information to mask the overlapping channel with WLAN and use the other channels for scanning BLE advertisement devices according to some implementations. In some implementations, BLE uses the receive information to reduce scan time spent on the overlapping channels with WLAN.

Figure 8:
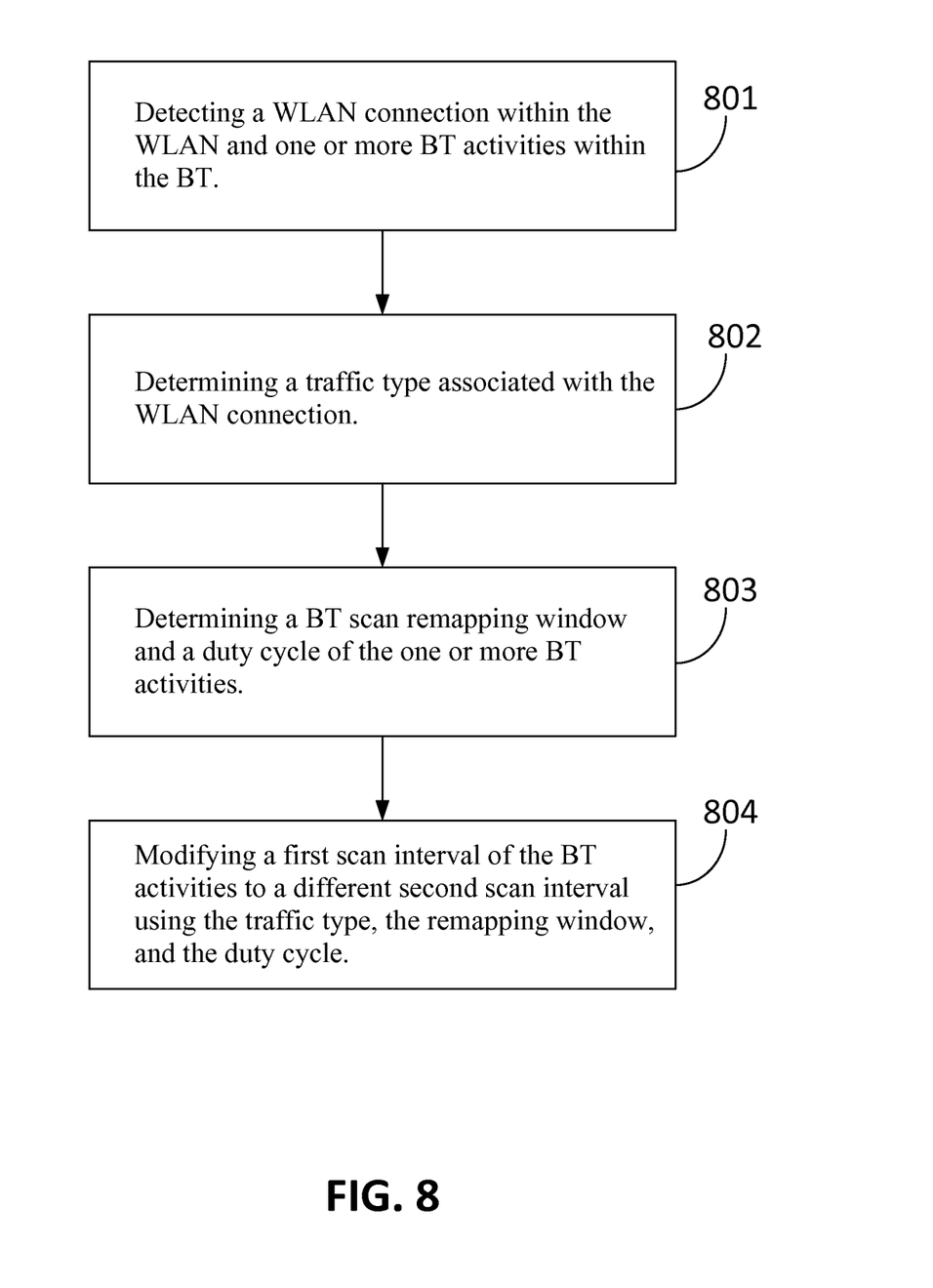
FIG. 8 is a flow chart of a process for modifying a scan interval for BT activities in a network including BT and WLAN connections according to an illustrative implementation.

FIG. 8 shows a flow chart of a process for providing wireless communications in a wireless system. The wireless system includes both WLAN and BT (e.g., BLE) network. In some implementations, each of the WLAN and BLE network includes one or more network connections. When the WLAN is active, BLE can remap the BLE interval in such a way that the priority of the BLE scans can be handled.

At operation 801, a WLAN connection within the WLAN and one or more Bluetooth connections within the BT (e.g., BLE) network are detected. The detected BT connections are associated with a first scan interval. During the first scan interval, the BT connections scans continuously.

At operation 802, a traffic type associated with the WLAN connection is determined. In some implementations, the traffic type includes any types of WLAN traffic, such as a best-effort/background traffic type, a Video/Voice traffic type, etc.

At operation 803, a BLE scan remapping window and a duty cycle of the one or more BT connections are determined. In some implementations, the remapping window is a configurable parameter which can also depend on the WLAN traffic type. In some implementations, if the WLAN traffic is best-effort/background traffic (e.g., reduced priority traffic), the BLE interval can be chosen as the longer interval so that BLE gets larger continuous scan time. In this way, BLE advertising reception is higher especially for the BLE devices with larger BLE advertisement interval. In some implementations, if the WLAN traffic is Video/Voice traffic or other increased-priority traffic for which lower WLAN latency is desired, the BLE remapping window can be set to a smaller size. In some implementations, the duty cycle is requested by an application and indicates the priority.

At operation 804, the first scan interval is modified to a second scan interval using the traffic type, the remapping window and the duty cycle. The second scan interval is different from the first scan interval. The modified scan interval allows the WLAN and BT connections prioritize their activities without starving the other connections.

The implementations of the present disclosure can be practiced in a variety of wireless communication devices that operate in both wireless Bluetooth (BT) and WLAN environment or network. The examples described herein pertain to devices that operate within the Bluetooth low energy (BLE) specification (also BT standard and/or protocol) and/or the WLAN protocol in the 2.4 GHz ISM band and utilizing one of the IEEE 802.11 protocols (e.g. 802.11a/b/g/n). It should be noted that the terms "Bluetooth", "BT", and the like, as used herein, refer to BT standards and/or protocols that can include BLE and/or other BT implementations.

Throughout the present disclosure, reference is made to a wireless device, an electronic device, a BT device, devices, device, smart device, and a WLAN device, as example implementations. It should be understood that the implementations can be adapted to portable (e.g., mobile phone or tablet) and stationary (e.g., desktop or game device) wireless communication devices alike.

Those of skill in the art would appreciate that the various illustrative blocks, circuits, elements, components, and methods described herein can be implemented as electronic hardware, computer software, or combinations of both. To illustrate this interchangeability of hardware and software, various illustrative blocks, circuits, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

What is claimed is:

1. A wireless communication device capable of operating in both a wireless local area network (WLAN) and a Bluetooth (BT) network including a plurality of BT connections, comprising:
    circuitry configured to:
    determine time schedules associated with a plurality of BT activities for the plurality of BT connections of the BT network;
    determine, for at least one time schedule, one or more adjacent time schedules associated with different BT activities;
    aggregate a first anchor point of the at least one time schedule with a second anchor point of the one or more adjacent time schedules into a time slot;
    determine an aggregated time schedule for the plurality of BT activities based on the time slot; and
    determine a WLAN schedule based at least in part on the aggregated time schedule for the plurality of BT activities.

2. The wireless communication device of claim 1, wherein each time schedule comprises a plurality of anchor points and time intervals between the plurality of anchor points, each anchor point indicating a start time point for a BT grant.

3. The wireless communication device of claim 1, wherein the circuitry is configured to determine the first anchor point of the at least one time schedule, and the second anchor point of the one or more adjacent time schedules.

4. The wireless communication device of claim 1, wherein the circuitry is configured to determine the aggregated time schedule by determining an aggregated time interval indicating time between a first BT grant and a second BT grant.

5. The wireless communication device of claim 4, wherein the aggregated time interval is determined using time intervals of one or more different BT activities and a maximum latency limit associated with the one or more different BT activities.

6. The wireless communication device of claim 5, wherein the circuitry is configured to determine the aggregated time schedule by determining an aggregated time duration as a sum of time duration associated with the first anchor point and time duration associated with the second anchor point.

7. The wireless communication device of claim 1, wherein the first anchor point and the second anchor point have a time difference less than a time difference threshold value.

8. A wireless communication device capable of operating in both a wireless local area network (WLAN) and a Bluetooth (BT) network including a plurality of BT connections, comprising:
    circuitry configured to:
        determine time schedules associated with a plurality of BT activities for the plurality of BT connections of the BT network, wherein each time schedule comprises a plurality of anchor points and time intervals between the plurality of anchor points, each anchor point indicating a start time point for a BT grant;
        determine, for at least one time schedule, one or more adjacent time schedules associated with different BT activities by determining, for at least one anchor point of the at least one time schedule, one or more adjacent anchor points associated with one or more different BT activities, wherein the circuitry is configured to determine the one or more adjacent anchor points by determining a time difference between the at least one anchor point and each of the one or more adjacent anchor points is less than a time difference threshold value;
        aggregate the at least one time schedule with the one or more adjacent time schedules;
        determine an aggregated time schedule for the plurality of BT activities using the aggregation; and
        determine a WLAN schedule based at least in part on the aggregated time schedule for the plurality of BT activities.

9. A method for providing wireless communications in a coexisted wireless local area network (WLAN) and Bluetooth (BT) network, comprising:
    determining time schedules associated with a plurality of BT activities for a plurality of BT connections of the BT network;
    determining, for at least one time schedule, one or more adjacent time schedules associated with different BT activities;
    aggregating a first anchor point of the at least one time schedule with a second anchor point of the one or more adjacent time schedules into a time slot;
    determining an aggregated time schedule for the plurality of BT activities based on the time slot; and
    determining a WLAN schedule based at least in part on the aggregated time schedule for the plurality of BT activities.

10. The method of claim 9, wherein each time schedule is a periodic time schedule that comprises a plurality of anchor points and time intervals between the plurality of anchor points, each anchor point indicating a start time point for a BT grant.

11. The method of claim 10, further comprising determining the first anchor point of the at least one time schedule, and the second anchor point of the one or more adjacent time schedules.

12. The method of claim 11, wherein determining the first anchor point and the second anchor point comprises determining a time difference between the first anchor point and the second anchor point is less than a time difference threshold value.

13. The method of claim 9, wherein determining the aggregated time schedule comprises determining an aggregated time interval indicating time between a first BT grant and a second BT grant.

14. The method of claim 13, wherein the aggregated time interval is determined using time intervals of one or more different BT activities and a maximum latency limit associated with the one or more different BT activities.

15. The method of claim 14, wherein determining the aggregated time schedule comprises determining an aggregated time duration as a sum of time duration associated with the first anchor point and time duration associated with the second anchor point.

* * * * *